(12) United States Patent
Terranova et al.

(10) Patent No.: US 6,789,733 B2
(45) Date of Patent: *Sep. 14, 2004

(54) REMOTE BANKING DURING FUELING

(75) Inventors: Steven N. Terranova, Greensboro, NC (US); John S. McSpadden, Greensboro, NC (US)

(73) Assignee: Gilbarco Inc., Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/446,031

(22) Filed: May 27, 2003

(65) Prior Publication Data

US 2003/0205619 A1 Nov. 6, 2003

Related U.S. Application Data

(63) Continuation of application No. 09/779,822, filed on Feb. 8, 2001, now Pat. No. 6,685,089, which is a continuation of application No. 09/295,626, filed on Apr. 20, 1999, now abandoned.

(51) Int. Cl.[7] .............................. G06F 7/08; G06F 17/00
(52) U.S. Cl. .................................. 235/381; 235/375
(58) Field of Search ................................. 235/379, 380, 235/381, 382, 383; 705/13, 16

(56) References Cited

U.S. PATENT DOCUMENTS

| | | | |
|---|---|---|---|
| 4,189,031 A | 2/1980 | Vayda, Jr. ..................... 186/1 C |
| 4,395,626 A | 7/1983 | Barker et al. ................ 235/381 |
| 5,047,613 A | 9/1991 | Swegen et al. .............. 235/379 |
| 5,302,811 A | 4/1994 | Fukatsu ....................... 235/381 |
| 5,343,970 A | 9/1994 | Severinsky ................ 180/65.2 |
| 5,605,182 A | * 2/1997 | Oberrecht et al. ............. 141/94 |
| D386,882 S | 11/1997 | Smith et al. .................. D99/28 |
| 5,725,124 A | 3/1998 | Bustos et al. ................ 221/211 |
| 5,797,470 A | 8/1998 | Bohnert et al. ............... 186/53 |
| 5,816,174 A | * 10/1998 | Smith et al. .................. 109/56 |
| 5,816,443 A | 10/1998 | Bustos ........................ 221/211 |

(List continued on next page.)

FOREIGN PATENT DOCUMENTS

| | | | | |
|---|---|---|---|---|
| EP | 145034 A1 | * 6/1985 | ............ B67D/5/08 |
| GB | 2217073 A | 10/1989 | |
| WO | WO 96/28791 | 9/1996 | |
| WO | WO 96/28791 A1 | * 9/1996 | ........... G06F/17/60 |
| WO | WO 97/20291 | 6/1997 | |
| WO | WO 97/21199 | 6/1997 | |
| WO | WO 97/24689 | 7/1997 | |
| WO | WO 98/45820 | 10/1998 | |

OTHER PUBLICATIONS

Convenience Store Decisions, "And Away We Go!", pp. 124–128, Nov. 1998.
National Petroleum News, "ATMs: More Than Meets the Eye", pp. 27–32, Dec. 1998.
Armor Safe Technologies, ValiDROP Digital Deposit Validating Safe, Model 1800.
Armor Safe Technologies, The ValiDROP, Model 1861.
Armor Safe Technologies, CacheDROP, Model 1826.

(List continued on next page.)

*Primary Examiner*—Thien M. Le
*Assistant Examiner*—April Taylor
(74) *Attorney, Agent, or Firm*—Withrow & Terranova, PLLC

(57) ABSTRACT

The present invention provides a system and method allowing customers to conduct a remote banking transaction at a fuel dispenser, including obtaining cash in association with the transaction at the dispenser or a common terminal in the dispenser forecourt. The system may include a cash dispenser at the dispenser, fueling position, or the central terminal, or, alternatively, a delivery system configured to deliver cash from a central location to the customer at the dispenser, fueling position, or central terminal. During a transaction for purchasing fuel or other products associated with the service station, a customer is provided an opportunity to conduct a remote banking transaction. Providing a customer the opportunity to conduct such a transaction in association with a dispenser transaction will attract more customers to the station because of convenience as well as provide customers with more disposable cash to spend at the associated quick-serve restaurants and convenience store.

29 Claims, 14 Drawing Sheets

U.S. PATENT DOCUMENTS

| | | | |
|---|---|---|---|
| 5,826,246 A | 10/1998 | Bator et al. | 705/403 |
| 5,842,188 A | 11/1998 | Ramsey et al. | 705/416 |
| 5,859,416 A | 1/1999 | Gatto | 235/384 |
| 5,895,457 A | 4/1999 | Kurowski et al. | 705/413 |
| 5,918,764 A | 7/1999 | Bustos et al. | 221/211 |
| 6,003,771 A | 12/1999 | Kusters | 235/383 |
| 6,032,126 A | 2/2000 | Kaehler | 705/16 |
| 6,032,703 A | 3/2000 | Baker et al. | 141/94 |
| 6,032,859 A | 3/2000 | Muehlberger et al. | 235/449 |
| 6,055,521 A | 4/2000 | Ramsey et al. | 705/413 |
| 6,065,568 A | 5/2000 | Harder | 186/53 |
| 6,073,840 A | 6/2000 | Marion | 235/381 |
| 6,089,284 A | 7/2000 | Kaehler et al. | 141/94 |
| 6,092,629 A | 7/2000 | Bohnert et al. | 186/53 |
| 6,098,879 A | 8/2000 | Terranova et al. | 235/384 |
| 6,112,152 A * | 8/2000 | Tuttle | 701/115 |
| 6,114,834 A | 9/2000 | Parise | 320/109 |
| 6,116,505 A * | 9/2000 | Withrow | 235/381 |
| 6,164,491 A * | 12/2000 | Bustos et al. | 221/211 |
| 6,263,319 B1 * | 7/2001 | Leatherman | 705/30 |
| 6,470,288 B1 * | 10/2002 | Keidel et al. | 702/122 |
| 6,685,089 B2 * | 2/2004 | Terranova et al. | 235/381 |
| 2001/0045457 A1 * | 11/2001 | Terranova et al. | 235/381 |
| 2003/0075600 A1 * | 4/2003 | Struthers et al. | 235/381 |

OTHER PUBLICATIONS

Armor Safe Technologies, ChangeBANK Digital Dispensing Safe, Model 2800.
Armor Safe Technologies, RediCACHE Digital Deposit and Dispensing Safe, Model 3800.
Armor Safe Technologies, POSiCACHE Digital Deposit and Dispensing Safe, Model 4800.
Armor Safe Technologies, The TREASURY Digital Deposit and Dispensing Safe, Model 6800.
Armor Safe Technologies, The TREASURY thru–wall.

* cited by examiner

REMOTE BANKING DURING FUELING

The present application is a continuation application of U.S. patent application Ser. No. 09/779,822, filed Feb. 8,2001, now U.S. Pat. No. 6,685,089, the disclosure of which is hereby incorporated by reference in its entirety, which is a continuation of U.S. patent application Ser. No. 09/295,626, filed Apr. 20, 1999, now abandoned.

BACKGROUND OF THE INVENTION

The present invention relates in general to fuel dispensers and fuel dispensing environments, and, in particular, to a dispenser and dispensing system capable of facilitating remote banking transactions through a financial network.

Historically, a fuel dispenser's only function was to dispense fuel from an underground storage tank to an automobile. As technology evolved, fuel dispensers were equipped with credit and debit card readers, and, to a limited extent, cash acceptors. These developments facilitated easy payment and dramatically increased convenience to customers. The increased convenience to the customer increased the number of transactions for each dispenser at a fueling station, but actually decreased the volume of sales in convenience stores associated with the fueling station. "Pay at the pump" customers are completing their transaction at the dispenser without going into the convenience store and purchasing goods and services that provide higher profit margins than fuel.

In an effort to attract customers into the convenience store, today's fuel dispensers provide various levels of merchandising and advertising for marketing specific products and services, most of which are paid for at the dispenser using the card reader or cash acceptor. A further advancement in dispenser technology provides wireless communications between a dispenser or associated communications system and a remote communication unit or transponder carried by a person or mounted to a vehicle. These wireless communications systems typically interrogate the transponder to receive identification and account information sufficient to facilitate a transaction.

As indicated above, items purchased in a convenience store or associated quick-serve restaurant are much more profitable than the gasoline dispensed in the forecourt of a gas station. Many of the "pay-at-the-pump" customers are trying to maximize convenience and often carry little or no cash. Many of these customers avoid conducting a card transaction at the dispenser and then going into the convenience store to conduct another card transaction for additional products. If customers have sufficient disposable cash, they are more likely to conduct a quick cash transaction in the convenience store to purchase products. Unfortunately, most "pay-at-the-pump" customers do not have excess cash to purchase products. Furthermore, many times these customers would like quick access to cash and would find obtaining cash at a service station convenient "Pay-at-the-pump" customers are generally comfortable conducting transactions at automated teller machines (ATM's) and use these machines for many, basic banking transactions.

Although many convenience stores now have ATM's, these machines are typically located in the convenience store and require customers to conduct fueling and banking transactions at separate locations. Typically, the banking transaction must occur before or after fueling. Unfortunately, the dead time during fueling usually requires the customer to remain at the fuel dispenser. Given the above, there is a need to provide a customer with cash in association with a fueling transaction and/or facilitate remote banking during a fueling operation.

SUMMARY OF THE INVENTION

The present invention provides a system and method allowing customers to conduct a remote banking transaction at a fuel dispenser, including obtaining cash in association with the transaction at the dispenser or a common terminal in the dispenser forecourt. The system may include a cash dispenser at the dispenser, fueling position, or the central terminal, or, alternatively, a delivery system configured to deliver cash from a central location to the customer at the dispenser, fueling position, or central terminal. During a transaction for purchasing fuel or other products associated with the service station, a customer is provided an opportunity to conduct a remote banking transaction. Providing a customer the opportunity to conduct such a transaction in association with a dispenser transaction will attract more customers to the station because of convenience as well as provide customers with more disposable cash to spend at the associated quick-serve restaurants and convenience store.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
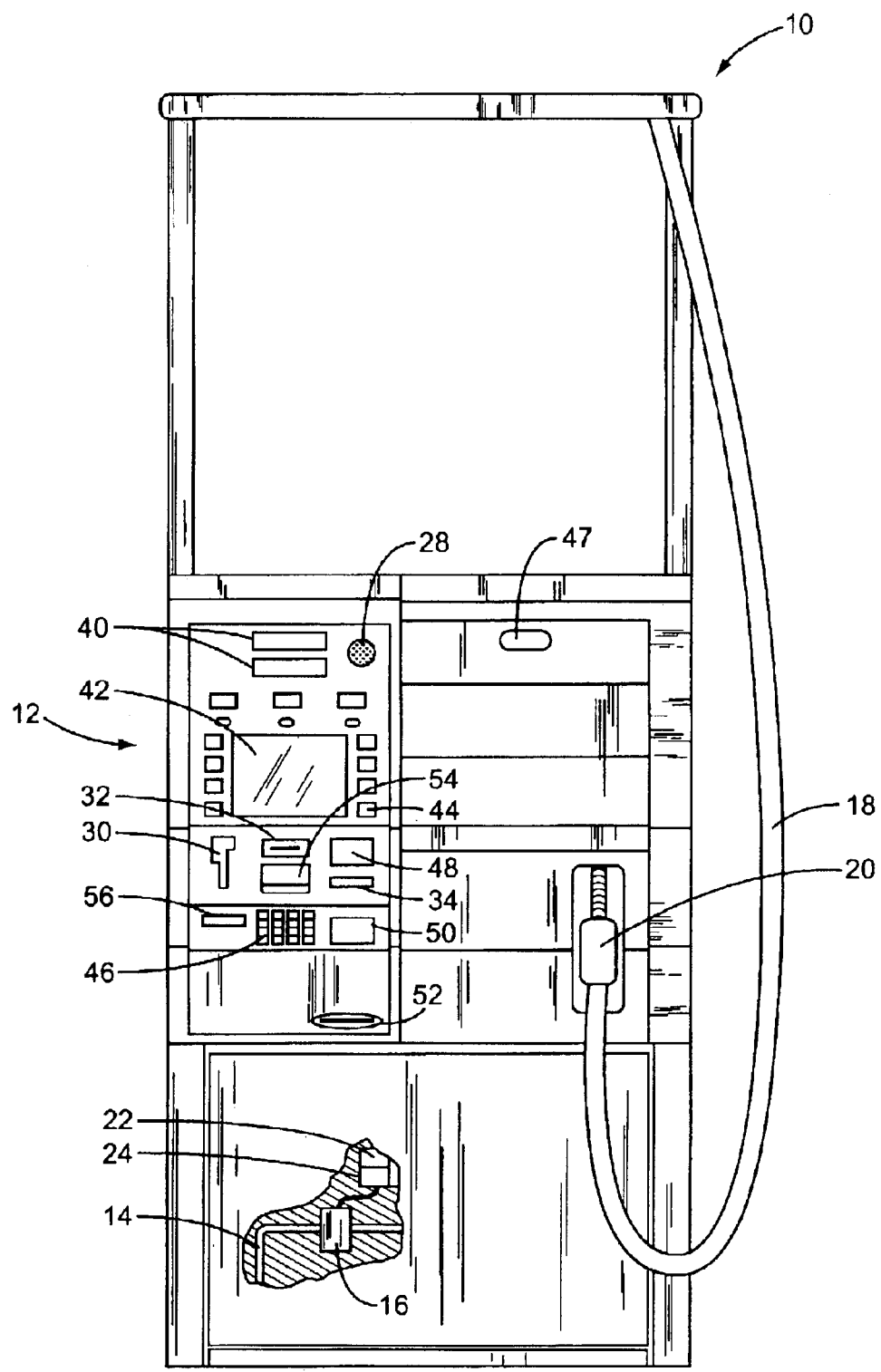
FIG. 1 is a depiction of a fuel dispenser equipped with an interface according to the present invention.

In the following description, like reference characters designate like or corresponding parts throughout the several views. The illustrations are for the purpose of describing preferred embodiments of the invention and are not intended to limit the invention thereto. Given the nature of the present application, an overview of the fueling environment is discussed followed by a detailed description of the various functional aspects of the invention.

As seen in FIG. 1, a fuel dispenser 10 is shown constructed according to the present invention with a user interface 12 and a fuel delivery system. The delivery system provides a fuel delivery path from an underground storage tank to a vehicle. The delivery path includes a fuel delivery line 14 having a flow meter 16. The fuel delivery line 14 communicates with a fuel delivery hose 18, which extends outside the dispenser 10 and has a delivery nozzle 20. The delivery nozzle 20 provides manual control of fuel delivery to the vehicle.

The dispenser 10 also includes a control system 22 having one or more controllers and associated memory 24. The control system 22 operates to control the dispenser interface 12 and the fuel delivery system. The dispenser interface will include various combinations of subsystems to facilitate customer interaction with the dispenser and communication between the dispenser and local and remote systems. The dispenser may also be equipped with an audio system with one or more speakers 28 in order to provide various beeps, tones and audible messages to a customer. These messages may include warnings, instructions, and advertising.

Figure 2:
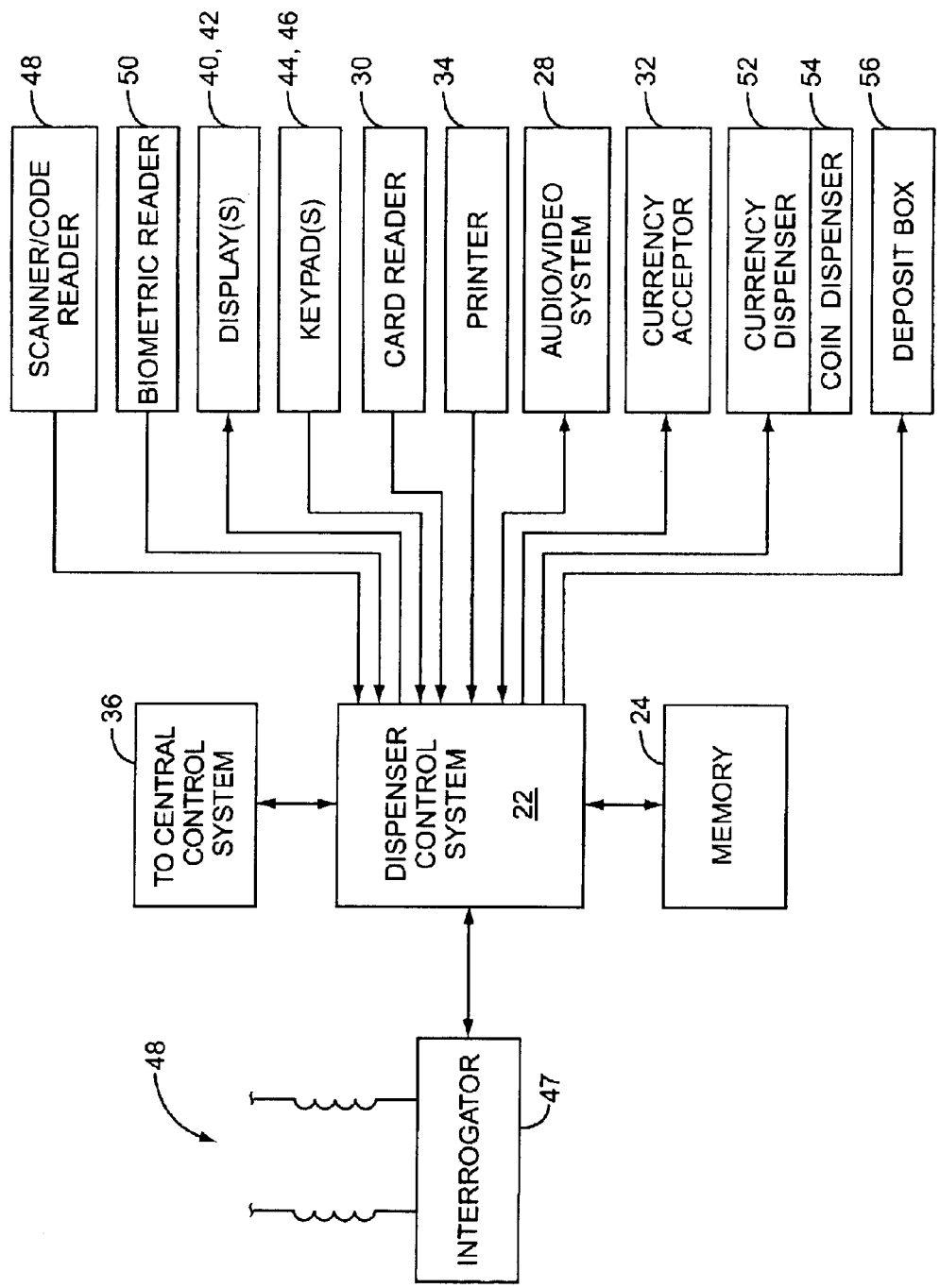
FIG. 2 is a block schematic of the fuel dispenser of FIG. 1.

In one embodiment of the present invention, the dispenser 10 is equipped with a card reader 30, cash acceptor 32, and printer 34. With these options, the dispenser control system 22 may read data from the magnetic strip of a card inserted into the card reader 30 as well as account for cash received from a customer during a transaction. As shown in FIG. 2, such financial information is typically communicated to a central control system 36, located in another part of the fueling environment. The central control system may be the G-SITE controller sold by Gilbarco Inc., 7300 West Friendly Avenue, Greensboro, N.C. The central control system 36 generally communicates with a remote network 38, such as an account verification authority, to ascertain whether a transaction proposed to be charged or debited from an account associated with the card inserted in die card reader 30 is authorized. For transactions receiving cash through the cash acceptor 32, an amount of cash received by the dispenser is forwarded to the central control system 36 for accounting. A receipt of any transaction occurring at the dispenser is printable using a printer 34.

The dispenser 10 may include one or more displays, such as an alphanumeric display 40 and a high resolution graphics display 42. The graphics display 42 is preferably a liquid crystal display or cathode-ray tube configured to display graphics, video, or a combination thereof. Either of these displays may be associated with one or more keypads, such as soft keys 44 or the hard keypad 46. Either of these keypads may be integrated with one of the displays to provide a touch-activated interface.

The fueling environment, and preferably each dispenser, may be equipped with wireless communication electronics to provide uni- or bi-directional communications between a customer or vehicle carrying a corresponding remote communications device. The communication electronics will typically include a transmitter for transmitting signals to the remote communication device and a receiver for receiving signals emanating from the remote communication device. Likewise, the remote communication device may also include a receiver and transmitter. The transmitter and receiver of the remote communication device may separately receive and separately transmit signals in cooperation with an associated control system, or may be configured so that the transmitter actually modifies the signal received from the communication electronics in the fueling environment.

For the sake of conciseness and readability, the term "transponder" is used herein to describe any type of remote communication device capable of communicating with the communication electronics of the fueling environment. Similarly, the communication electronics in or associated with the dispenser 10 is referred to as an "interrogator" 47. Typically, the transponder is used to quickly and efficiently transmit account and identification information to a dispenser to facilitate a transaction taking place at the dispenser. A unique and optional aspect of the present invention is to use the transponder to help correlate and identify a customer starting a transaction at one point in the fueling environment and completing the transaction at another point, wherein the transponder is interrogated at each point to help identify a user with a select transaction or operation.

The dispenser 10 may also be equipped with a scanner or code reader 48, such as a bar code reader, to receive additional information from a customer. The information may come from a printout received from another location, or a code on an associated card or like medium. The dispenser 10 may also include a biometric reader 50 for reading fingerprints, retinal information, or like biometric indicia to help identify a user and facilitate secure transactions.

Of particular interest with respect to the first embodiment, the dispenser 10 may include a currency dispenser 52 and/or a coin dispenser 54 configured to dispense paper currency or coins in response to signals from the dispenser control system 22. In this embodiment of the present invention, the dispenser control system and currency dispenser 52 cooperate to dispense a requested amount of cash to the customer at the end of a banking transaction requesting a cash withdrawal.

In certain embodiments, it is preferable to equip the dispenser 10 with a currency dispenser 52 for dispensing paper currency and not to equip the dispenser 10 with a coin dispenser 54 to minimize cost and complexity of the system. Other embodiments may require the addition of a coin dispenser 54. Operation of the system with respect to providing a remote banking transaction during a dispenser transaction is discussed below.

The dispenser of this embodiment may include a deposit box 56 for receiving various types of financial documents and cash for deposit with the service station or associated financial institution. Each dispenser is configured to facilitate various financial transactions, including facilitating cash withdrawals, fund transfers, account status checking, and making deposits, alone or in association with a fueling transaction. The dispenser in this embodiment does not require delivery systems configured to physically transfer documents, including cash or coins, to the dispenser from a central location.

Figure 3:
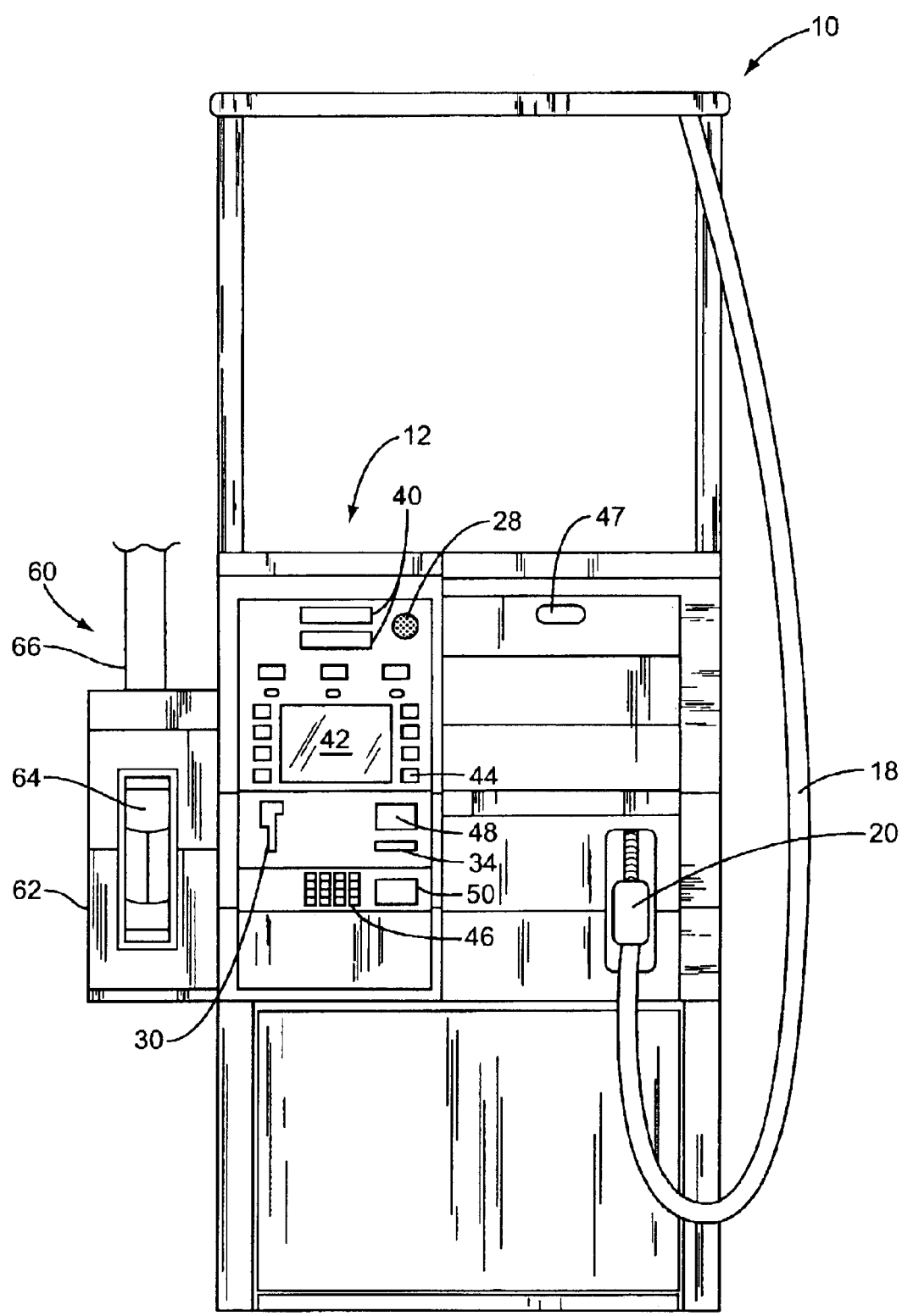
FIG. 3 is a depiction of a fuel dispenser having an associated delivery terminal.
Figure 4:
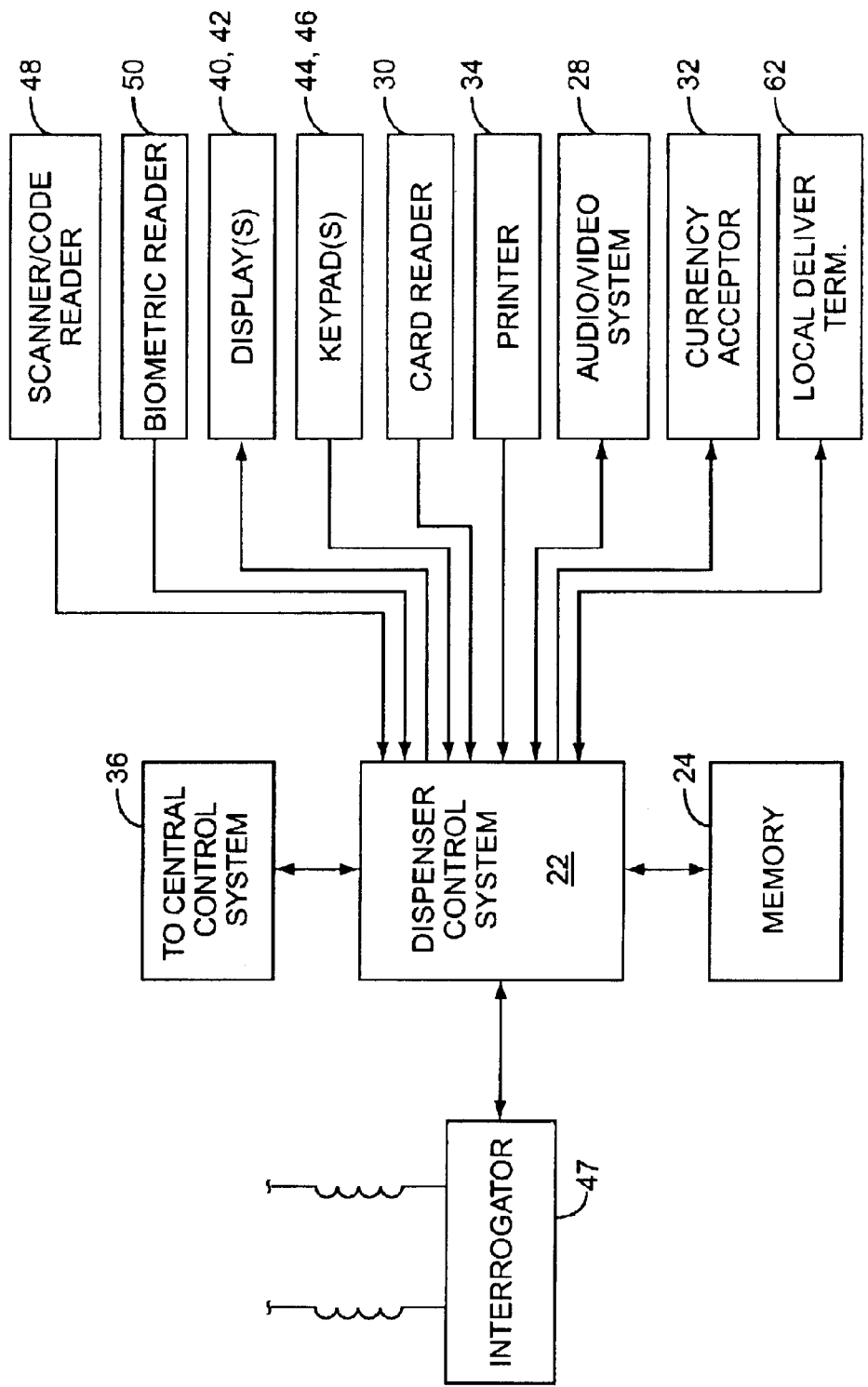
FIG. 4 is a block schematic of the fuel dispenser of FIG. 3.
Figure 5:
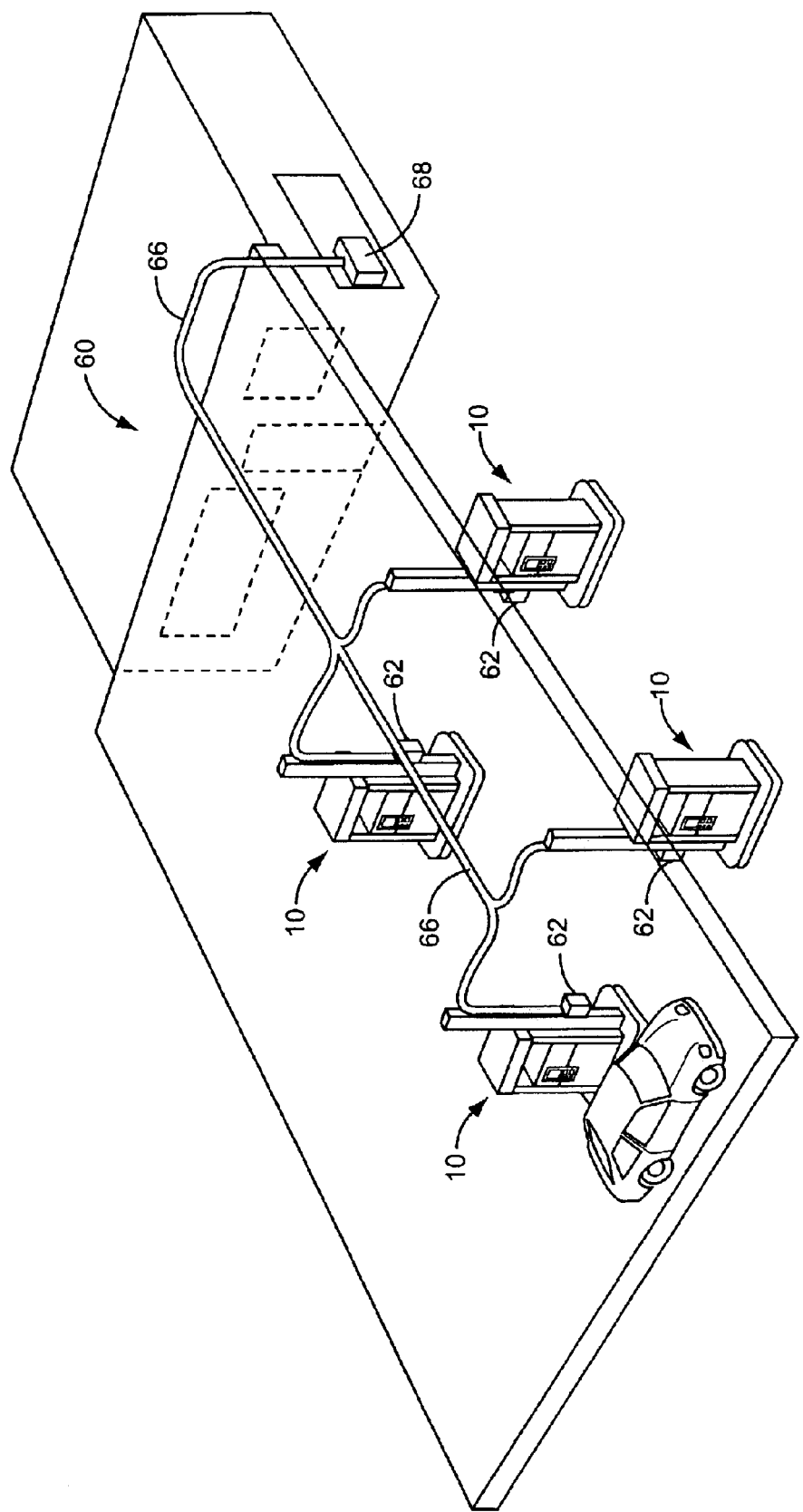
FIG. 5 is a perspective view of a fueling environment configured with a pneumatic delivery system capable of delivering cash from a central location to each of a plurality of fuel dispensers.

In a second embodiment of the invention, as depicted in FIGS. 3–5, each dispenser in the service station forecourt is associated with a mechanical, and preferably pneumatic, delivery system 60. The delivery system 60 is configured to physically transfer documents and products, including cash, from a local delivery terminal 62 associated with each dispenser 10 to a central delivery terminal 68 via a delivery transport 64. The transport 64 includes delivery tubing 66 between the local and central delivery terminals 62, 68.

In other respects, the fuel dispenser 10 is equipped similar to the first embodiment discussed above, with the exception that cash is not dispensed from the system within or associated with the dispenser, but from the delivery system 60. It is important to note that the local delivery terminal 62 of the second embodiment and the cash dispenser of the first embodiment may be integrated within the dispenser, attached to the dispenser, or configured as a stand-alone system substantially adjacent to the dispenser. Furthermore, these systems may be associated with a single dispenser or each fueling position of a dispenser. For the sake of conciseness and readability, only the integrated cash dispenser embodiment and delivery embodiment having an attached local delivery terminal 62 are discussed in detail.

Figure 6:
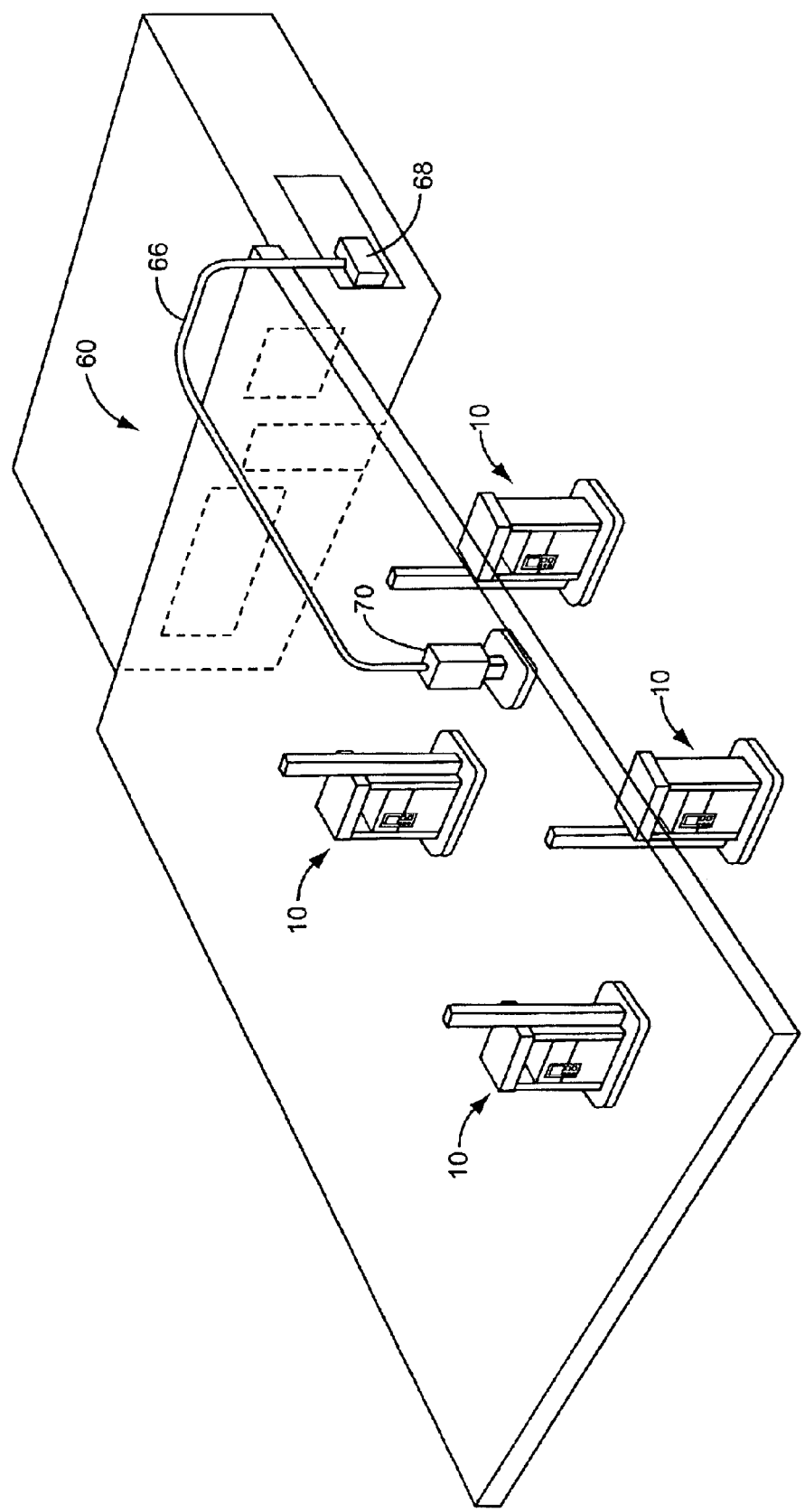
FIG. 6 is a perspective view of a fueling environment having a pneumatic delivery system configured to deliver cash to a common location in the forecourt of the fueling environment.

A third embodiment is shown in FIG. 6 wherein a delivery system 60 cooperates between a central delivery terminal 68 and a common delivery terminal 70 located in the forecourt of the service station. Instead of having immediate access to the delivery system at each dispenser, the common delivery terminal 70 is provided which is accessible by customers conducting transactions at any dispenser. As such, a customer at any of the dispensers requesting or receiving cash or other documents may conduct the banking transaction at any of the dispensers and actually receive the cash or documents at the common delivery terminal 70.

Figure 7:
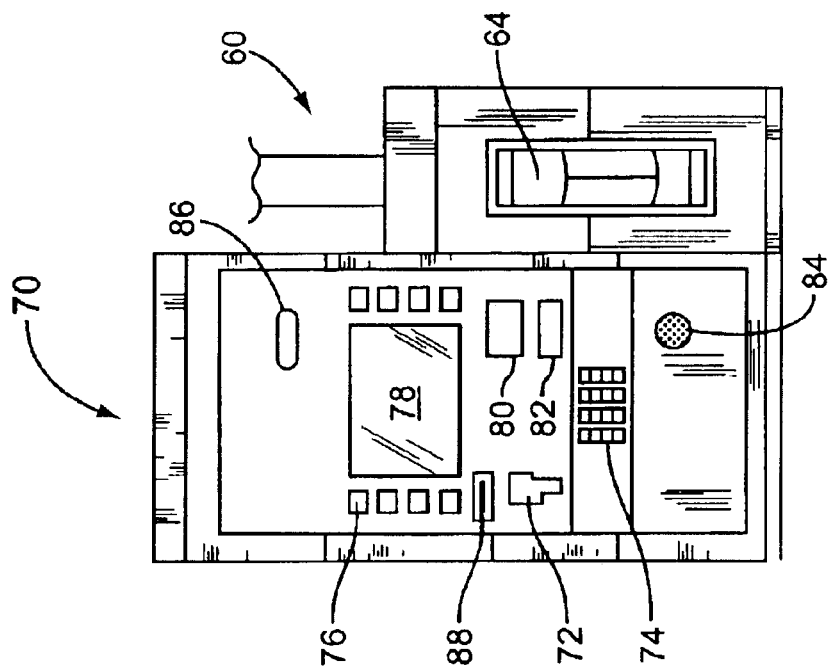
FIG. 7 is a depiction of a common terminal associated with a delivery terminal of a pneumatic delivery system.

FIG. 7 depicts one embodiment of a common delivery terminal 70 having a card reader 72, hard keypad 74, soft keypad 76, and display 78. The common delivery terminal 70 may also include a scanner or code reader 80, biometric reader 82, audio system 84, interrogator 86, and printer 88. These systems operate in similar fashion to corresponding systems located in the dispenser as discussed with the above embodiments.

Figure 8:
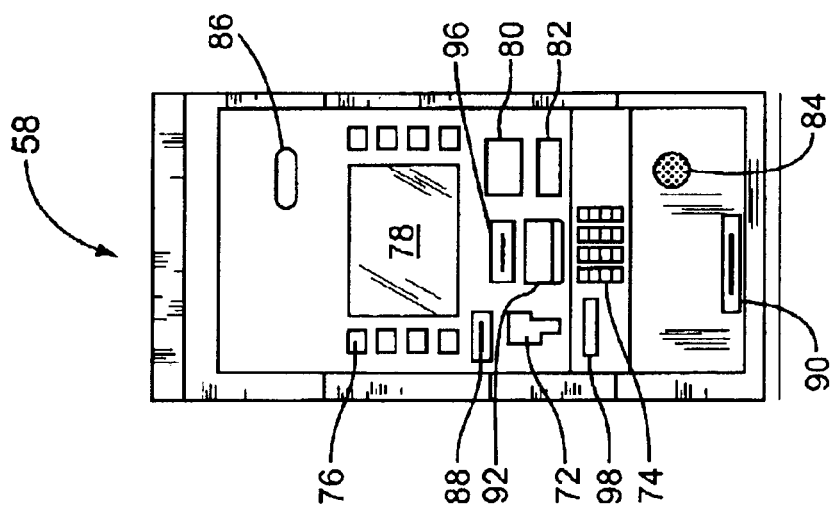
FIG. 8 is a depiction of a common terminal having a coin and currency dispenser.

In yet another embodiment shown in FIG. 8, a common dispensing terminal 58 may be located in a common location in the forecourt, in a fashion similar to that described with the common delivery terminal 70. The difference between the common delivery terminal 70 and the common dispensing terminal 58 shown in FIG. 8 is that a delivery system is not required, and the terminal is configured to dispense cash from internal reserves. Preferably, the common dispensing terminal 58 may include a hard keypad 74, soft keypad 76, display 78, and printer 88. As noted with the common delivery terminal 70, a scanner or code reader 80, biometric reader 82, audio system 84, and interrogator 86 may also be provided.

Preferably, the common dispensing terminal 58 will include a currency dispenser 90 for delivering cash back to a customer in association with a transaction. An optional coin dispenser 92 is also available. To make additional purchasing easy, an optional currency acceptor 96 and card reader 72 is provided. In an effort to facilitate additional financial transactions, a common deposit box 98 is provided to receive various documents associated with any type of financial transaction occurring at the common dispensing terminal 58.

Various financial transactions are made possible at the dispenser or a common terminal 58, 70 without requiring the customer to directly interface with an automated teller machine. These functions may include checking account status, making deposits, or withdrawing cash from an account associated with a customer's card, transponder, or other portable, readable media carrying financial information. Of particular importance, customers conducting transactions at a dispenser will be able to receive cash in the forecourt without having to enter the station or conduct a second financial operation.

Figure 15:
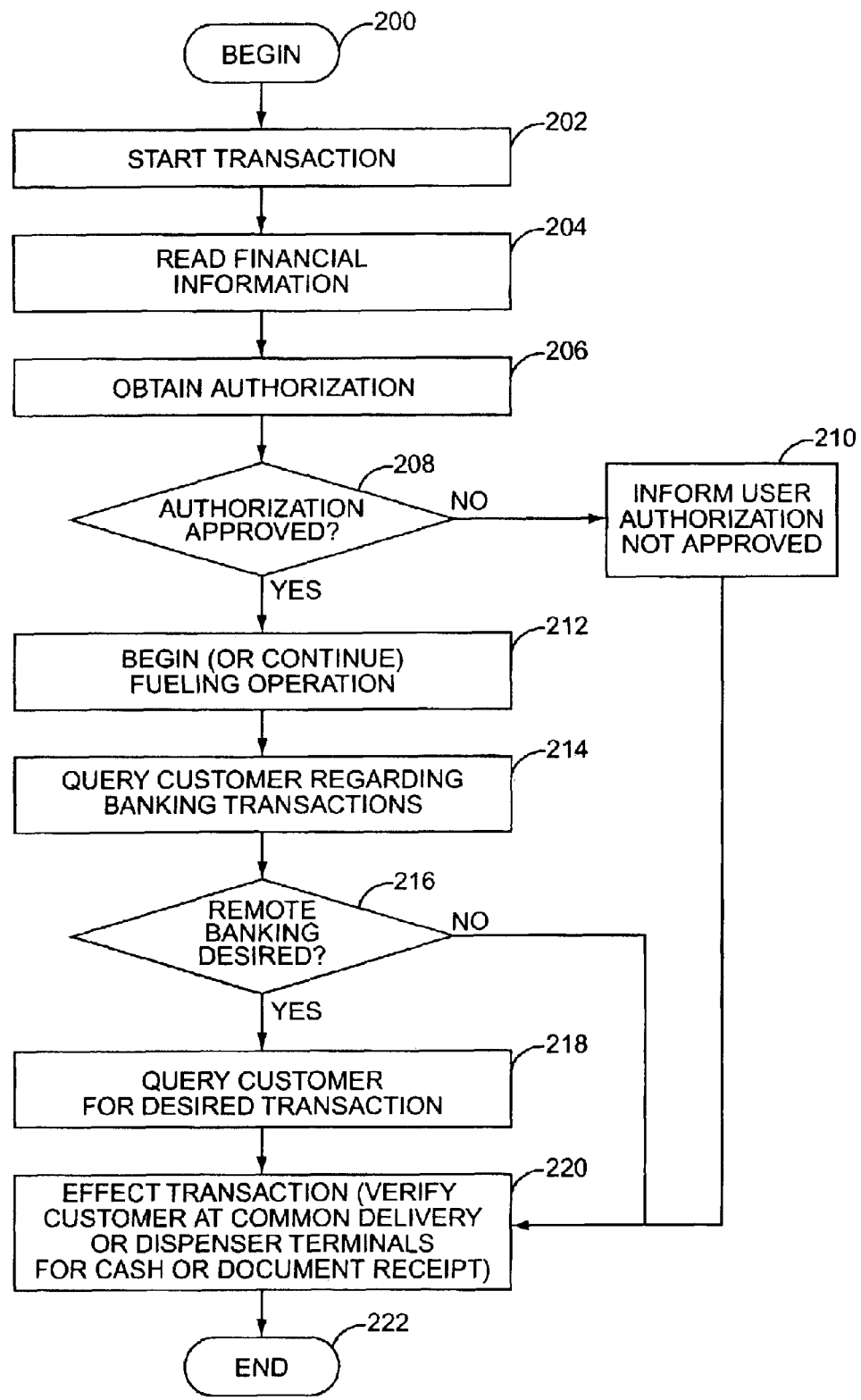
FIG. 15 is a flow chart illustrating the basic operation of the dispensing system effecting a remote banking transaction.

Turning now to FIG. 15, a flow chart outlining the basic operation of one embodiment of the present invention is shown. For customers beginning a fueling transaction or already in the midst of a fueling transaction, the remote banking process begins (block 200). Depending upon the system configuration, the customer or fuel dispenser can initiate the start of a remote banking transaction (block 202) where a customer's financial information is read (block 204). This information can be received from a prior reading of a magnetic card, transponder, or other media, or may be received after requesting the information or interrogating the transponder concurrently with the transaction. Generally, the fuel dispenser will cooperate with the central control system and one or more remote networks to obtain authorization for the fueling transaction (block 206). Pre-authorization for certain remote banking transactions may also be provided. If authorization is not obtained (block 208), the customer is informed (block 210) and the process ends (block 222). Assuming authorization is obtained (block 208), generally, the fueling process will begin or continue (block 212). Depending on the system configuration, certain systems will require pre-authorization before beginning a fueling transaction while other systems allow initial fuel delivery before authorization is obtained in order to expedite the fueling operation.

Although the customer may be queried at any time before, during, or after the fueling transaction regarding remote banking transactions (block 214), the most opportune time to query a customer for such a transaction is during the fueling operation (block 212). If a remote banking transaction is not desired (block 216), fueling will continue until the fueling operation ends (block 222). If a remote banking transaction is desired (block 216), the customer is queried for the desired transaction (block 218). As noted, any type of remote banking transaction may be provided. In essence, the fuel dispenser is a virtual automated teller machine.

Once the customer has selected the desired transaction and taken the necessary steps to enter the required information, the transaction is effected (block 220). Notably, depending on the system configuration, the remote banking transaction may require additional steps for completion, especially if cash or documents are provided to the customer. In the embodiments where these documents can be dispensed or delivered directly to the dispenser, verification of the customer accepting the cash or documents is typically not necessary. If cash or documents are dispensed or delivered at a common terminal, a secure verification system is preferred. Such verification may include any type of reconfirmation of information received at the dispenser, entering an identification number, or scanning information carried by the customer or received by the customer at the dispenser. Biometric verification is also possible.

DETAILED OPERATION OF THE ABOVE EMBODIMENTS

Figure 9:
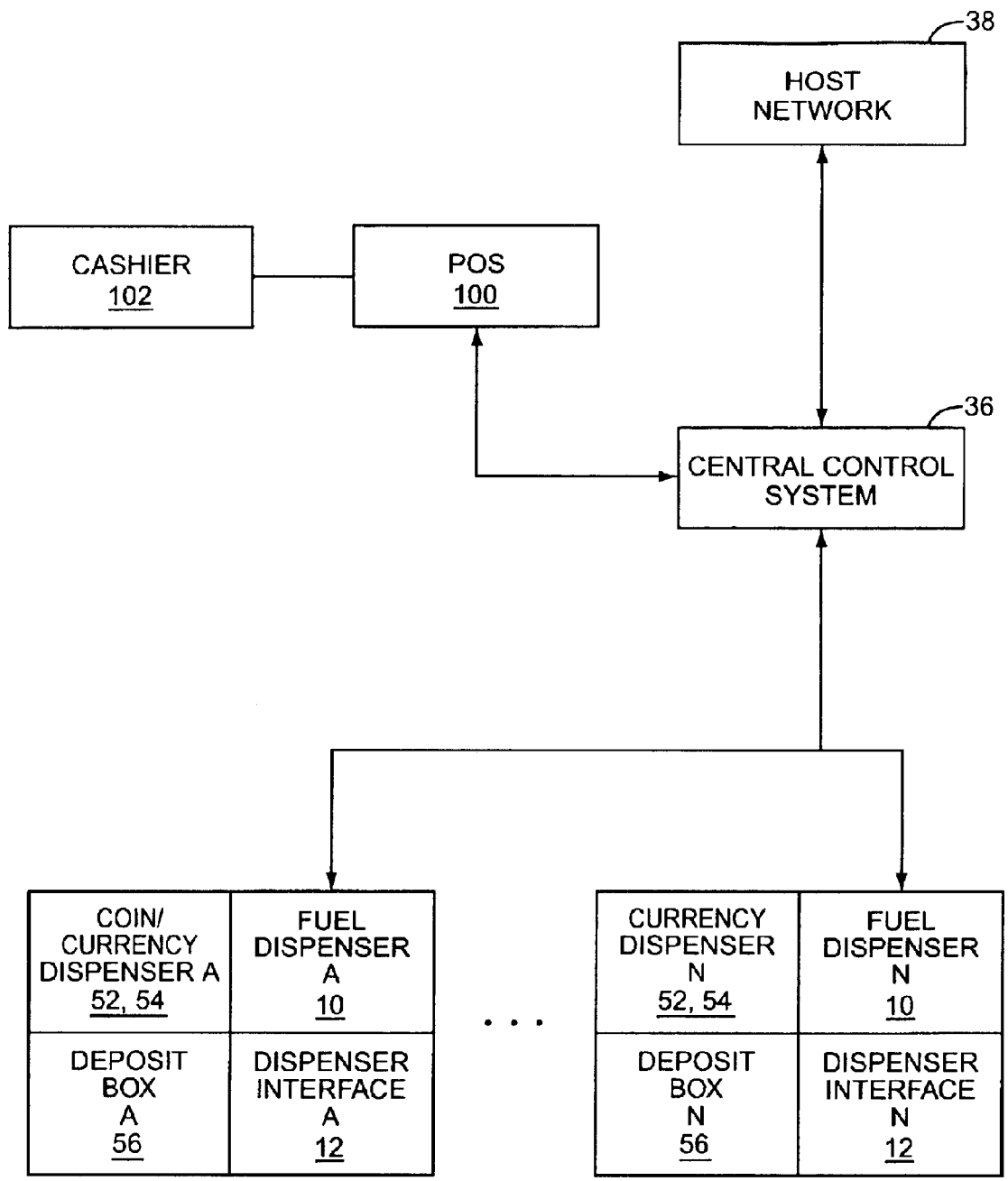
FIG. 9 is a block schematic of a system constructed according to the present invention having a cash dispenser at each fuel dispenser.

Referring now to FIG. 9, a block schematic of the first embodiment is shown wherein fuel dispensers 10 are equipped with currency and/or coin dispensers 52, 54 for dispensing cash to a customer. Each of the dispensers are preferably in communication with a central control system 36, which is in further communication with a host network 38. The host network 38 maybe an account verification authority, financial institution, or other network or institution effecting or necessary for customer transactions. The central control system 36 may also be associated with a point-of-sale (POS) terminal 100 located in the convenience store or associated quick-serve restaurant. The POS terminal is usually operated by a cashier 102.

During operation, a customer typically interfaces with the fuel dispenser 10 via the dispenser interface 12 to conduct a transaction to purchase fuel or order goods or services from the convenience store, quick-serve restaurant, or associated car wash. In association with the transaction, the fuel dispenser 10 is configured to query the customer as to whether he/she would like to conduct a remote banking transaction. During initiation of the fueling transaction, transactions to be credited to or debited from an associated account are handled by the fuel dispenser 10 transferring the information to the central control system 36, which in turn sends the financial information along with transactional information to the host network 38 for authorization and ultimate accounting. A request for a cash withdrawal or transaction may take place during this initial authentication-process or may be accounted for at or near the end of the primary transaction. For example, the fuel dispenser 10 and central control system 36 may cooperate to add to the transaction total the amount of cash requested by the customer, and send the total to the host network 38 for accounting. As such, the host network never actually realizes that cash is being provided to the customer, in addition to accounting for the transaction. Alternatively, the amount of cash requested by the customer may be accounted for and authorized separately by the central control system 36 and host network 38. Those of ordinary skill in the art will recognize numerous methods of accounting for the cash requested back by the customer. In order to provide the customer with cash, the fuel dispensers 10 in FIG. 9 will cooperate with the central control system 36 to signal the currency and/or coin dispensers 52, 54 to dispense the proper amount of cash back to the customer.

Figure 10:
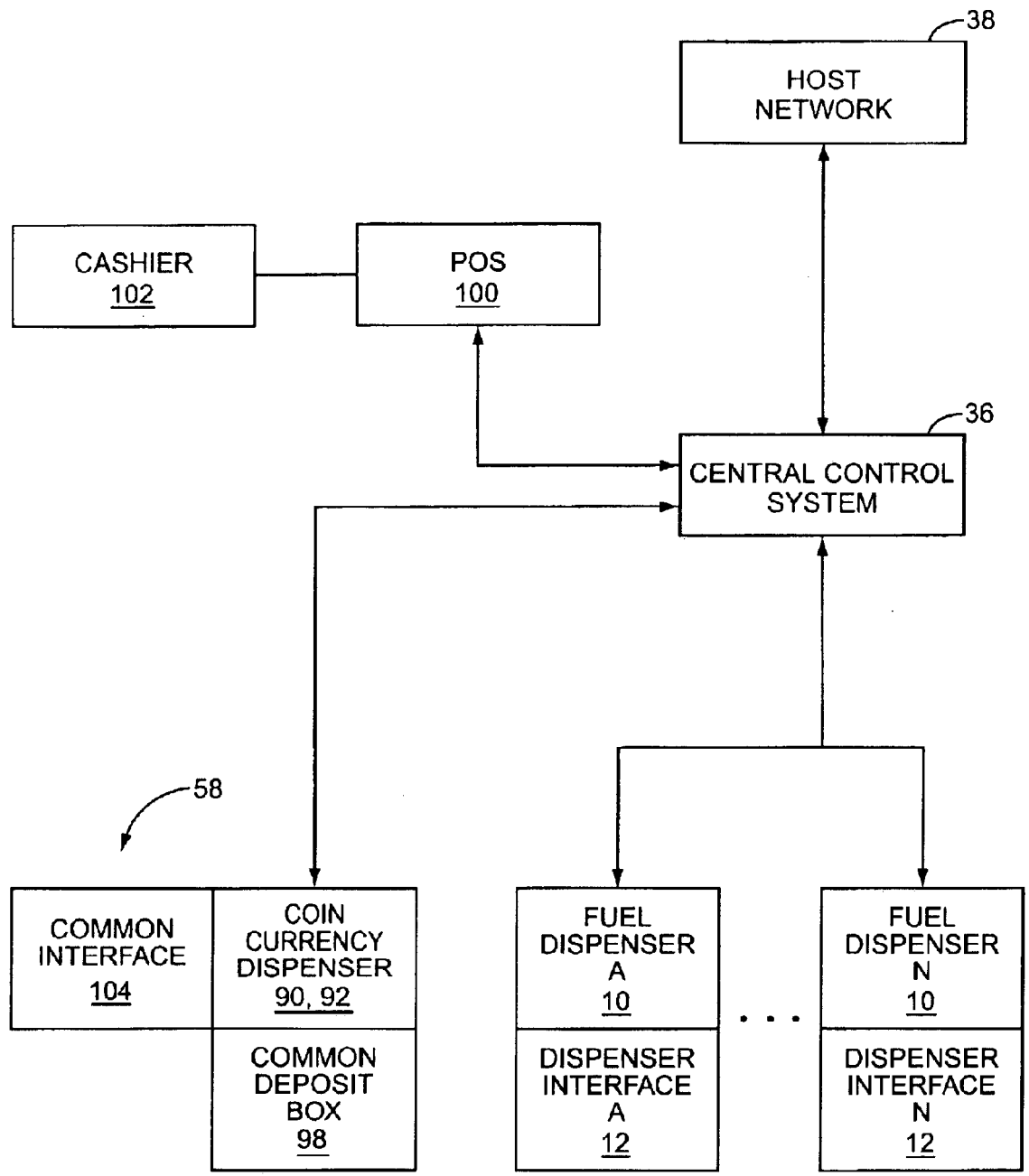
FIG. 10 is a block schematic of a system constructed according to the present invention having a common currency dispenser located in the forecourt.

In the embodiment shown in FIG. 10, the fuel dispensers 10 are not equipped to dispense cash, but are associated with the common dispensing terminal 58. In order for a customer to receive cash back, the initial transaction and request for additional cash is made at the fuel dispenser as described in the embodiment shown in FIG. 9. An additional step is required with the embodiment of FIG. 10 wherein the customer must go to the common dispensing terminal to receive the cash back. In order to make sure the proper customer receives the cash requested, additional verification of the customer associated with a select amount of cash back must take place at the common dispensing terminal 58. Such verification may require entering a personal identification number (PIN), code, reinserting the magnetic card, or simply having the common dispensing terminal 58 interrogate a transponder associated with the customer using the interrogator 86.

As those skilled in the art will recognize, there are many ways to verify a customer at the common dispensing terminal 58 and associate that customer with the proper amount of cash to dispense. In addition to the above-mentioned techniques, the fuel dispenser 10 may print a code or number at the fuel dispenser 10 which is subsequently entered or scanned by the common dispensing terminal 58 to match the customer with the selected cash or documentation. Upon verification, the central control system will cooperate with the common dispensing terminal 58 to dispense the proper amount of cash using the currency or coin dispenser 90, 92.

With either of the embodiments shown in FIG. 9 or 10, other financial transactions may be effected at the fuel dispenser and/or common dispensing terminal 58. Preferably, deposits would be made at the deposit box 98 of the common dispensing terminal 58. Checking on account status or transferring funds from one account to another in a fashion similar to that done at an ATM may take place at the fuel dispenser during the fueling transaction or separately at the common dispensing terminal. Although the common dispensing terminal may be directly associated with the various fuel dispensers in the forecourt, it is preferable to have the central control system 36 serve as the control center for each of the fuel dispensers as well as any common dispensing terminals 58.

Figure 11:
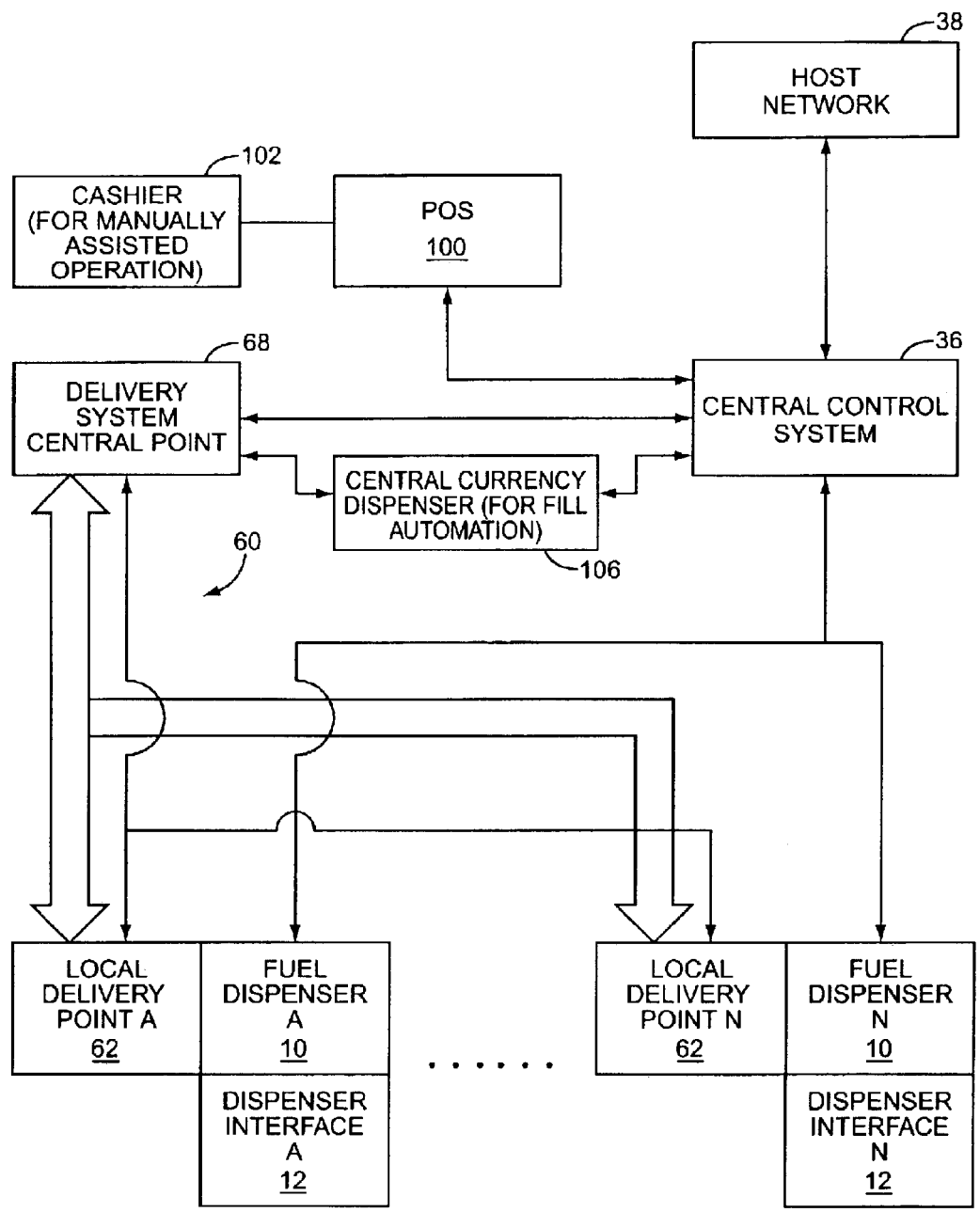
FIG. 11 is a block schematic of a system constructed according to the present invention having a delivery system configured to deliver cash to each fuel dispenser.

Turning now to FIG. 11, a block diagram of a pneumatic delivery system is shown having local delivery points 62 associated with each of the fuel dispensers 10 in the forecourt. Accounting for transactions and conducting automated teller-type functions at the dispenser are typically handled via the central control system 36 in association with one or more host networks 38. The central control system 36 is usually in communication with and operates to control the delivery system 60 based on customer requests and transactions at each fuel dispenser 10. Preferably, cash or other products for delivery to a local delivery terminal 62 associated with any of the fuel dispensers 10 are loaded manually at the central delivery terminal 68 by a cashier 102 or other site personnel, or automatically from a central currency dispenser 106. If a central currency dispenser 106 is used, it is also preferably controlled by the central control system 36 such that cash or documents requested by the customer are automatically loaded into the delivery system 60 at the central delivery point 68 by the central currency dispenser 106. After being loaded at the central delivery terminal 68, cash and dispenser is transported to the select local delivery point 62.

In this embodiment, deposits may be made at the local delivery point and sent to the central delivery point for deposit. Financial transactions, such as transferring money from one account to another that do not require delivery or deposit, may take place at the fuel dispenser. Additional information relating to pneumatic delivery systems may be found in the following references:

U.S. Pat. No. 3,365,146 (Freeman) Issued Jan. 23, 1968

U.S. Pat. No. 3,877,241 (Wade) Issued Apr. 15, 1975

U.S. Pat. No. 3,951,461 (De Feudis) Issued Apr. 20, 1976

U.S. Pat. No. 4,189,031 (Vayda, Jr.) Issued Feb. 19, 1980

U.S. Pat. No. 4,284,370 (Danler et al.) Issued Aug. 18, 1981

U.S. Pat. No. 4,930,941 (Willey et al.) Issued Jun. 5, 1990

U.S. Pat. No. 5,092,714 (Porter et al.) Issued Mar. 3, 1992

U.S. Pat. No. 5,354,152 (Reinhardt et al.) Issued Oct. 11, 1994

U.S. Pat. No. 5,562,367 (Scott) Issued Oct. 8, 1996

U.S. Pat. No. 5,636,710 (Ables et al.) Issued Jun. 10, 1997

U.S. Pat. No. 5,725,124 (Bustos et al.) Issued Mar. 10, 1998

These patents are incorporated herein by reference.

Figure 12:
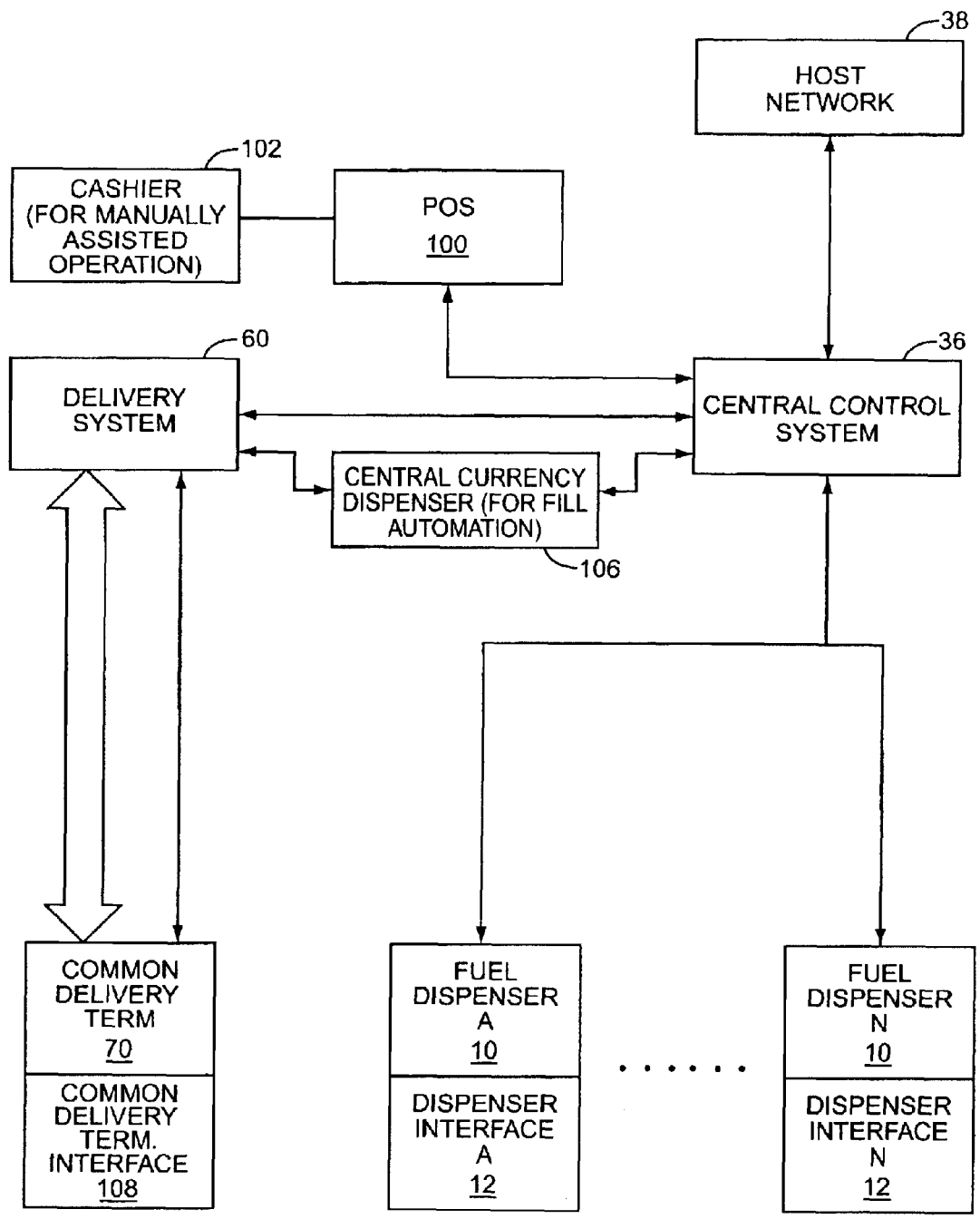
FIG. 12 is a block schematic of a system constructed according to the present invention having a delivery system for delivering cash to a common delivery terminal located in the forecourt.

FIG. 12 depicts a delivery system in a fueling environment wherein a common delivery terminal 70 is placed in the forecourt. The operation of the delivery system is analogous to the delivery embodiment discussed immediately above, yet requires verification of a customer at the common delivery terminal 70 before cash or products are made accessible or delivered to the customer. In a typical operation, the customer supplies account information to the fuel dispenser using a card, transponder, or other medium storing financial information to authorize fueling. The fuel dispenser transfers financial information to the central control system 36, which will request authorization from the host network 38. Upon authorization, the customer will begin fueling and/or order products from an associated quick-serve restaurant or convenience store, or purchase a car wash. During this transaction, the customer may request cash or conduct virtually any remote banking transaction. The cash request is accounted for either with the existing transactions or separately authorized by the central control system 36 and host network 38.

Once the transaction is over and the cash request is approved or authorized, the central control system 36 will query a cashier 102 to manually load the cash into the delivery system for delivery to the common delivery terminal or cause the central currency dispenser 106 to automatically load the requested amount of cash into the delivery system 60. The fuel dispenser then instructs the customer to move to the common delivery terminal 70 to receive the requested cash. In order to receive the cash, the customer must verify his or her identification in any number of ways, such as entering a PIN number or code, scanning indicia printed at the fuel dispenser for verification, entering a card into the card reader, or allowing a transponder to be interrogated by the interrogator 86. Any type of verification is acceptable and considered within the scope of the present invention.

Figure 13:
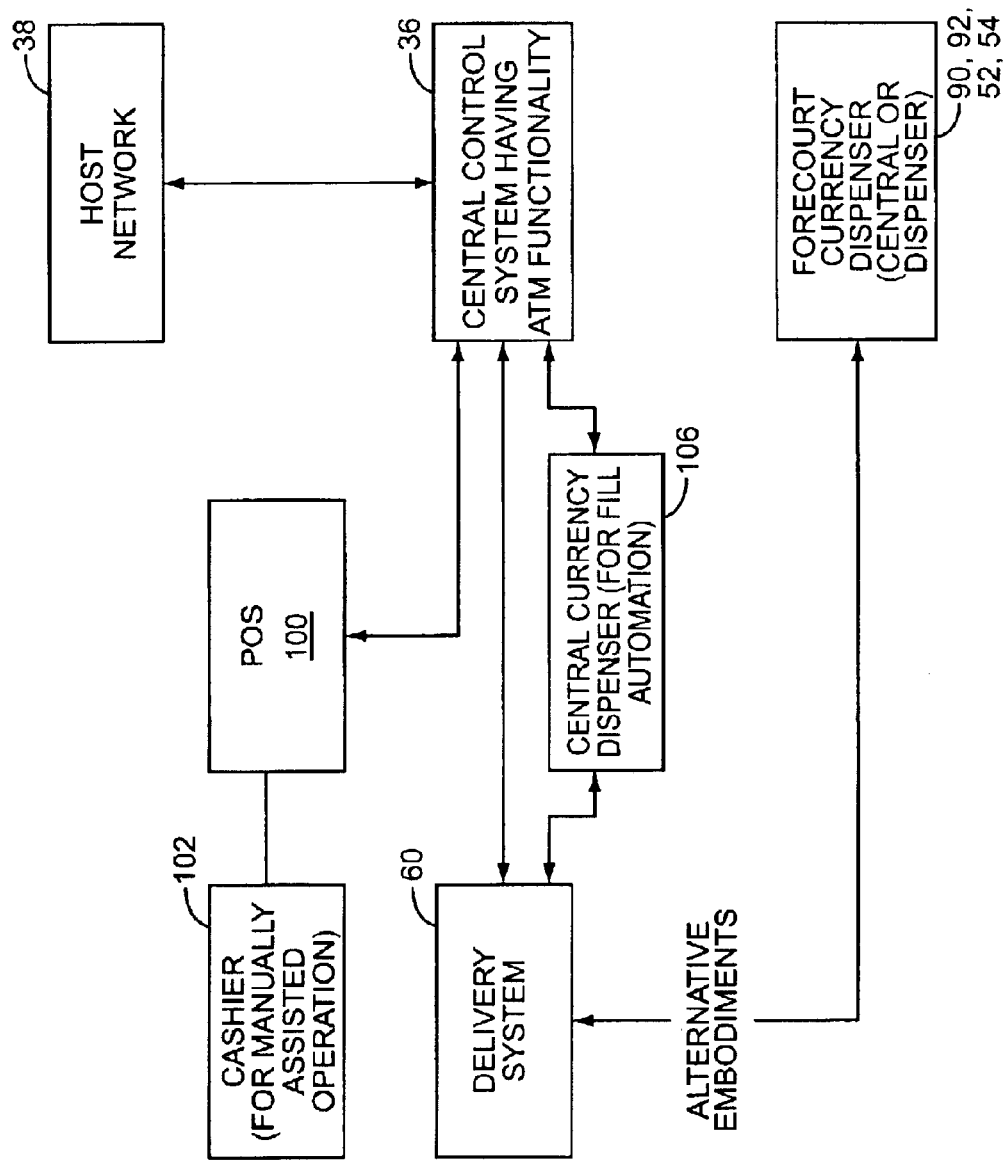
FIG. 13 is a block schematic wherein the central control system has automated teller functionality.
Figure 14:
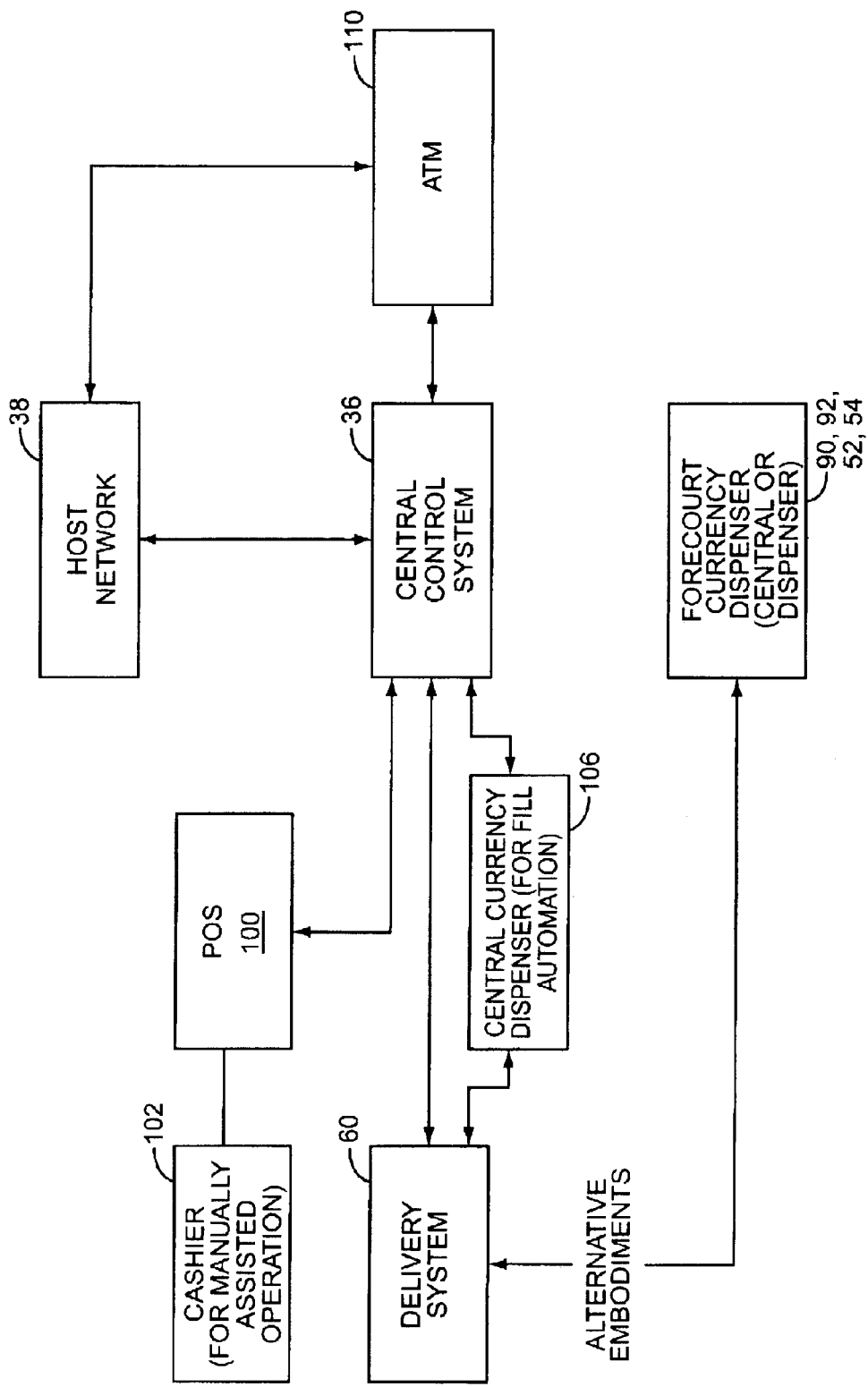
FIG. 14 is a block schematic wherein the central control system is associated with an automated teller machine.

The dispenser and central control system may be configured to provide virtually any ATM function at the dispenser 10. Regardless of whether delivery systems are implemented in the fueling environment or currency dispensers are used at the dispensers or common terminals, the central control system 36 may be configured to provide ATM functionality in addition to the typical management of the fuel dispensers, convenience store, quick-serve restaurant, car washes, and other systems throughout the fueling environment. For example, the central control system 36 may act as the heart of an ATM with a remote interface at the fuel dispensers 10 or common terminals 58, 70, as shown in FIG. 13. Alternatively, the central control system 36 may communicate directly with an ATM in the fueling environment. The ATM may access various host networks 38 directly or via the central control system 36. The dispenser may also share or contribute extensively to the control of the remote banking interface. In the embodiment shown in FIG. 14, accounting and control of ATM functions are provided via the ATM wherein tradition transactions are carried out through the central control system 36 in cooperation with the host network 38.

Those of ordinary skill in the art will recognize from the teachings herein additional ways to provide cash back and ATM functionality in the fueling environment. Furthermore, the system may be equally affective in an electrical power dispenser for charging electric vehicles. Any such modifications are considered to be within the scope of the present invention and the claims that follow.

What is claimed is:

1. A method for facilitating automated teller functions for fueling customers, comprising:
   commencing a fueling transaction at a fuel dispenser including delivering fuel to a customer's vehicle;
   providing a customer interface with a financial information reader on the fuel dispenser;
   associating a control system with the customer interface;
   reading account information from the financial information reader; and
   effecting, contemporaneously with the fueling transaction, automated teller functions using account information read from the financial information reader.

2. The method of claim 1 wherein providing a customer interface with a financial information reader on the fuel dispenser comprises providing a customer interface with a card reader.

3. The method of claim 1 wherein providing a customer interface with a financial information reader on the fuel dispenser comprises providing a transponder interrogator configured to receive wirelessly the financial information from a transponder.

4. The method of claim 1 further comprising dispensing cash to the customer in response to a transaction to withdraw cash.

5. The method of claim 4 further comprising dispensing cash to the customer comprises dispensing cash through a pneumatic delivery receptacle.

6. The method of claim 1 further comprising cooperating between the control system and a pneumatic delivery receptacle to effectuate delivery of cash or documents associated with a banking transaction effected at the dispenser.

7. A method for providing cash to a fuel dispenser customer comprising:
   at a fuel dispenser;
      allowing the fuel dispenser customer to select a banking transaction;
      obtaining financial information from the fuel dispenser customer;
      conducting a fueling transaction based in part on the financial information;
      communicating with a remote authorization network based on the financial information; and
      conducting a remote banking transaction.

8. The method of claim 7 further comprising delivering cash or documents associated with the remote banking transaction to the customer.

9. The method of claim 8 wherein delivering cash or documents associated with the remote banking transaction to the customer comprises delivering the cash or documents through a pneumatic delivery system.

10. The method of claim 9 wherein delivering the cash or documents through a pneumatic delivery system comprises loading cash or documents at a central terminal and receiving cash or documents at a remote terminal at or near the fuel dispenser.

11. The method of claim 10 wherein loading cash or documents at a central terminal comprises loading cash or documents at a central terminal adjacent a point-of-sale terminal associated with a central control system and configured to allow manual delivery of cash or documents to the central terminal.

12. The method of claim 10 wherein loading cash or documents at a central terminal comprises placing cash in the pneumatic delivery system with a cash dispenser associated with the central terminal.

13. The method of claim 8 further comprising associating a remote terminal for delivery of cash or documents associated with the remote banking transaction at one or more fuel dispensers within a fueling environment.

14. The method of claim 8 further comprising positioning a common terminal in a location near multiple fuel dispensers such that cash or documents associated with the remote banking transaction may be delivered to or from the common terminal.

15. The method of claim 7 further comprising dispensing, at the fuel dispenser, a cash amount to the fuel dispenser customer during a cash withdrawal transaction.

16. The method of claim 7 further comprising dispensing cash to the fuel dispenser customer from a cash dispenser during a cash withdrawal transaction.

17. A method of facilitating a remote banking transaction for a customer in a fueling environment comprising:

associating a central control system with a financial authorization system;

receiving customer financial information for a remote banking transaction;

interfacing with the customer through a customer interface on a fuel dispenser; and conducting the remote banking transaction by transferring the customer financial information to said central control system which forwards the customer financial information and remote banking transactional information to the financial authorization system to effect the remote banking transaction.

18. The method of claim 17 further comprising delivering cash or documents to the customer in a forecourt of a service station containing the fuel dispenser.

19. The method of claim 18 wherein delivering cash or documents to the customer in a forecourt comprises delivering cash or documents to the customer from a cash dispenser in or associated with the fuel dispenser.

20. The method of claim 18 wherein delivering cash or documents to the customer in a forecourt comprises delivering cash or documents in a stand-alone cash dispenser removed from the fuel dispenser.

21. The method of claim 18 wherein delivering cash or documents to the customer in a forecourt comprises delivering cash or documents to the customer with a pneumatic delivery system.

22. The method of claim 21 wherein delivering cash or documents to the customer with a pneumatic delivery system comprises using a central terminal and a remote terminal within the pneumatic delivery system.

23. The method of claim 22 further comprising positioning the remote terminal in or adjacent the fuel dispenser.

24. The method of claim 22 further comprising positioning the remote terminal apart from the fuel dispenser.

25. The method of claim 18 further comprising verifying a customer associated with the remote banking transaction and receiving verification from the customer before giving access to cash or document.

26. The method of claim 17 wherein carrying out the remote banking transaction comprises carrying out a remote banking transaction selected from the group consisting of a cash withdrawal, a transfer of funds, a deposit of funds, and an account balance inquiry.

27. A method of effecting a remote banking transaction at fuel dispenser, comprising:

delivering fuel to a vehicle through the fuel dispenser;

receiving financial information from a customer to conduct a remote banking transaction;

communicating from the fuel dispenser to an automated teller machine that facilitates the remote banking transaction; and cooperating amongst the fuel dispenser and the automated teller machine to effect the remote banking transaction contemporaneously with the delivering.

28. The method of claim 27 wherein communicating from the fuel dispenser to the automated teller machine comprises using an intermediary central control system.

29. A method of effecting a remote banking transaction at an energy dispenser, comprising:

delivering energy to a vehicle through the energy dispenser;

receiving financial information from a customer to conduct a remote banking transaction;

communicating from the energy dispenser to an automated teller machine that facilitates the remote banking transaction; and cooperating amongst the energy dispenser and the automated teller machine to effect the remote banking transaction contemporaneously with the delivering.

* * * * *

UNITED STATES PATENT AND TRADEMARK OFFICE
CERTIFICATE OF CORRECTION

PATENT NO. : 6,789,733 B2
DATED : September 14, 2004
INVENTOR(S) : Steven N. Terranova and John S. McSpadden It is certified that error appears in the above-identified patent and that said Letters Patent is hereby corrected as shown below:

Column 10,
Line 15, "further comprising" should be changed to -- wherein --.

Column 12,
Line 4, "document" should be changed to -- documents --.
Line 11, -- a -- should be inserted between "banking transaction at" and "fuel dispenser".

Signed and Sealed this

Eleventh Day of October, 2005

JON W. DUDAS
*Director of the United States Patent and Trademark Office*

Adverse Decision in Interference

Patent No. 6,789,733, Steven N. Terranova, John S. McSpadden, REMOTE BANKING DURING FUELING, Interference No. 105,397, final judgment adverse to the patentees rendered August 23, 2007, as to claims 1-2, 4, 7, 15-17, and 26-29.

*(Official Gazette March 18, 2008)*